United States Patent [19]
Rink

[11] Patent Number: 6,064,824
[45] Date of Patent: May 16, 2000

[54] UNDERWATER CAMERA HOUSING

[75] Inventor: Philip A. Rink, Everett, Wash.

[73] Assignee: Techsonic Industries, Inc., Eufala, Ala.

[21] Appl. No.: 09/116,505

[22] Filed: Jul. 16, 1998

[51] Int. Cl.[7] .................................................. G03B 17/08
[52] U.S. Cl. ................................ 396/25; 396/27; 348/81; 348/373; 348/376
[58] Field of Search .......................... 396/25, 535; 348/81

[56] References Cited

U.S. PATENT DOCUMENTS

| | | | |
|---|---|---|---|
| 4,033,659 | 7/1977 | Alpert | 339/60 |
| 4,281,343 | 7/1981 | Monteiro | 358/99 |
| 5,778,259 | 7/1998 | Rink | 396/27 |

*Primary Examiner*—Georgia Epps
*Assistant Examiner*—Timothy J Thompson
*Attorney, Agent, or Firm*—Kennedy, Davis & Hodge, LLP

[57] ABSTRACT

An underwater video camera housing body includes a hollow interior for positioning a camera therein. The front end of the body is configured to receive a transparent member in a watertight relationship thereto. A weight is positioned in the interior of the housing body which is sufficient to overcome the buoyancy of the water, so that the housing can readily sink in water. An opening in the body communicates with the interior of the body. A plug member is inserted into the opening, the plug member containing therein strain-relieving means for the video cable. The plug is filled with a potting material to waterproof the entry of the cable into the housing.

35 Claims, 1 Drawing Sheet

U.S. Patent | May 16, 2000 | 6,064,824
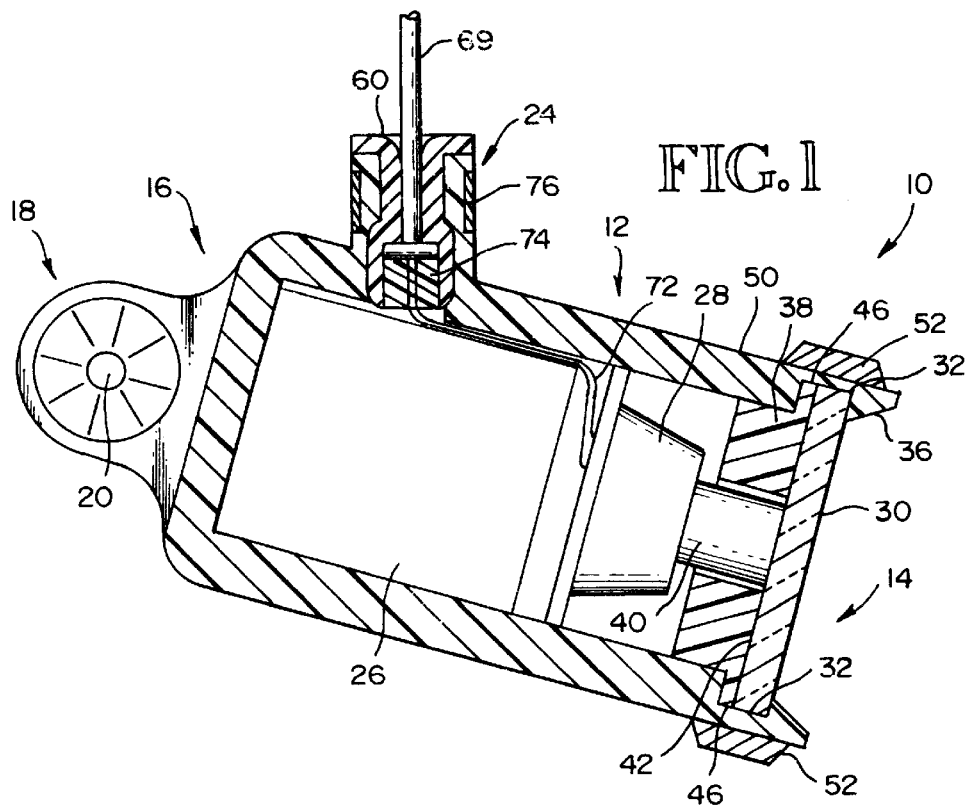

UNDERWATER CAMERA HOUSING

TECHNICAL FIELD

This invention relates generally to underwater video cameras, and in more detail concerns a particular arrangement for such a housing, including a plug connection for the video camera cable at its entry into the housing.

BACKGROUND OF THE INVENTION

A previous patent application entitled "Underwater Video Camera Housing", owned by the assignee of the present invention, discloses an underwater camera housing which has proven to be generally quite successful. However, that particular housing has some disadvantages, including the use of an integral metal cup which is molded into the housing and is thus an integral part of the housing, as well as the arrangement of the cable as it passes through the housing and into the interior thereof for connection to the camera. Also, in certain situations, such as when the video cable is accidentally punctured, water can move downwardly along the interior of the cable and into the interior of the housing, which could lead to electrical shorts in the housing. Further, the camera in the previous application is typically not positioned at the best viewing angle when it is suspended in water. Certain improvements to the housing disclosed in the previously filed application thus are desirable.

DISCLOSURE OF THE INVENTION

Accordingly, the present invention is an underwater camera housing, comprising: a housing body, which includes a hollow interior portion for positioning of a camera therein, the body including a portion at a front end thereof for receiving a transparent member in a watertight relationship; a weight positioned in the interior portion of the housing body sufficient to overcome the buoyancy of water, so the housing will readily sink in water; an opening in the housing body communicating with the interior portion thereof; and a plug member, insertable into the housing body opening in a waterproof relationship, wherein the camera cable extends through the plug member in a waterproof relationship thereto, and into the interior portion of the housing body for attachment to the camera therein.

BRIEF DESCRIPTION OF THE DRAWINGS

FIG. 1 is a cross-sectional view of the housing of the present invention, including a plug portion thereof.

FIG. 2 is a cross-sectional view showing in detail the plug portion of the housing.

FIG. 3 is an exterior view of the camera housing of the present invention, including the tail section thereof.

BEST MODE FOR CARRYING OUT THE INVENTION

The underwater camera housing of the present invention is shown generally at 10 in FIG. 1. It includes a body portion 12 which in the embodiment shown is a hollow cylinder approximately 2¼" in diameter and 3⅜" long, although these dimensions can be varied. The body 12 has a wall thickness of approximately 3/16" and is made from a hard plastic material such as urethane.

Body 12 is in the form of a cup, with front end 14 thereof being open and rear end 16 closed. Extending at a right angle from rear end 16 is a tail-mounting portion 18. Tail-mounting portion 18 is approximately ¼" thick and 1¼" wide and 1" long, although these dimensions can also be varied. Tail mounting portion 18 is located slightly offset from the centerline (plane) of the body 12, such that one surface thereof is on the center plane surface of rear end 16, extending through the center line of the body 12. Tail-mounting portion 18 has an opening 20 approximately in the center thereof.

At the top of body 12 is a cable plug receiving portion 24. In the embodiment shown, the plug receiving portion is approximately ¾" in diameter and centered on the center line of the body. It extends upwardly from body 12 for about ½" and extends at an angle of approximately 30° from the vertical (70° from the body), although this could be varied within a range of 10°–45° from the vertical, to achieve a desired viewing angle for the submerged camera. The cable plug receiving portion as well as the cable plug itself are discussed in more detail below.

Positioned in the hollow interior of body portion 12 is a 1 lb. lead weight 26 which is sufficient to overcome the buoyancy of the water, resulting in the housing and camera readily sinking in a body of water. In the embodiment shown, the outside diameter of the weight is slightly larger than the internal diameter of the body. The weight is pressed into the housing during assembly. The weight 26 is positioned toward the rear end of body interior and is held in place by friction.

Positioned toward the front of the body interior is a conventional video camera 28. Video camera 28 may be any one of various video cameras commercially available by several manufacturers.

At the front end of body 12 is a glass plate 30, the peripheral edge portion of which is positioned in a groove 32 in interior surface of body 12. The front surface of glass plate 30 abuts against a housing lip 36 at the front end of body 12. Behind glass plate 30 is a trim ring 38 which abuts against rear surface 42 of glass plate 30 and around lens 40 of video camera 28. A peripheral edge portion 46 of trim ring 38 extends into groove 32 so that edge portion 46 of the trim ring and the glass plate 30 fit snugly into groove 32.

Extending around outer surface 50 of body portion 12, outboard of groove 32, is a sealing ring 52. In the embodiment shown, this is a thermoset urethane ring, rather than a steel clamp. Ring 52 is initially heated and stretched while hot sufficiently to fit tightly around body 12 at the desired location. When ring 52 thereafter cools, it shrinks, producing a good clamping action around the body and creating a watertight seal between glass plate 30 and trim ring 38 relative to body 12. Sealing ring 52 even after cooling maintains a residual elasticity which tends to maintain a tight clamping action and to maintain the housing watertight.

FIG. 2 shows the details of the cable plug portion of the article of the present invention. The plug, shown generally at 60, fits tightly within the plug-receiving portion 24 of the housing body. Plug 60 is in the embodiment shown approximately 1¼" long. An upper portion 62 includes a top lip 64, the lower surface 65 of which abuts an upper edge of the plug-receiving portion 24 when the plug is properly positioned therein. The interior of upper portion 62 is funnel-like, as shown at 67, terminating in an opening which is approximately ⅛" in diameter. Plug 60 has a lower portion 66 which has an external diameter which is slightly larger than that of upper portion 62 and fits tightly within the plug-receiving portion 24 of body 12. Lower portion 66 has a hollow interior space 68 with an internal diameter of approximately 3/16".

The cable 69 for the video camera extends through the plug 60. The tensile strength members (Kevlar strands) 71 of the cable are wound around and fastened, such as by tying, to a dowel pin 70 which is positioned within the interior 68 of lower plug portion 66, against the upper surface thereof. Electrical leads 72 are soldered to cable conductors within the interior of plug 60. The leads 72 then connect to the video camera. The dowel pin 70 and the Kevlar strands take up the strain produced by the weight of the housing, instead of the leads. Lower portion 66 of plug 60 is then filled with an elastic potting material 74 which in effect waterproofs the entry of the leads into the interior of the housing. Hence, any water which may get into the cable from a puncture, typically outside of the housing, is effectively stopped by potting material 74, preventing any fluid from reaching the interior of the body through the plug.

Plug 60 is inserted into the plug-receiving portion 24 so that, as indicated above, the lower surface 65 of the top lip 64 of the plug abuts the upper edge of the plug-receiving portion 24. A stainless steel clamping ring 76 is then positioned around the plug receiving portion outboard from the upper portion 62 of the plug, but below the top lip 64, and then tightened. This squeezes the plug-receiving portion evenly against the upper portion 62 of the plug, in a watertight relationship, so that no water can get into the interior of the housing between the plug 60 and the plug-receiving portion 24.

With reference to FIG. 3, a tail 80 is connected to the tail-mounting portion 18 by means of a bolt and nut combination 82 or the like. The tail 80 can swivel about the nut and bolt combination. In the embodiment shown, tail 80 is approximately ⅛" thick and has a paddle-like configuration, increasing in width from approximately the diameter of the tail mounting portion to approximately 4". The total length of the tail is approximately 6". The upper edge 84 of the tail 80 includes a groove 86 therein, slightly smaller than the diameter of cable 69. The cable can be pressed into groove 86, with the tail having a gripping effect on the cable. A particular angular relationship between the housing, the cable and the tail is established, depending upon the point of contact between the cable and the tail. The angle of the tail relative to the camera housing can thus be varied and then maintained at various angles by connecting the cable with the tail at a selected point along the cable. This can be seen from FIG. 3. If the tail is not attached to the cable, the camera points downwardly at an angle of approximately 20° due to the angle of the plug-receiving portion relative to the body 12. Alternatively, the tail 80 could have a hook which connects with the video cable, and maintains the desired angular relationship between the housing, cable and tail.

Hence, an improved housing for underwater video cameras has been disclosed. In particular, the arrangement of the housing in which the weight for overcoming the buoyancy effect of the water is positioned within the housing, instead of integral with the housing itself, as well as the particular structure of the plug for entry of the cable into the housing, results in improved performance.

Although a preferred embodiment of the invention has been disclosed herein for illustration, it should be understood that various changes, modifications and substitutions may be incorporated in such embodiment without departing from the spirit of the invention, which is defined by the claims as follows.

What is claimed is:

1. An underwater camera housing, comprising:
   a housing body, which includes a hollow interior portion for positioning of a camera therein, the housing body including a portion at a front end thereof for receiving a transparent member in a watertight relationship;
   a weight positioned in the interior portion of the housing body, sufficient to overcome the buoyancy of water, so the housing body will readily sink in water;
   an opening in the housing body communicating with the interior portion thereof; and
   a plug member insertable into the housing body opening in a waterproof relationship, the plug member including potting material surrounding a plurality of leads from a camera cable extending therethrough, wherein the camera cable extends through the plug member in a waterproof relationship thereto and into the interior portion of the housing body for attachment to the camera therein, the camera able comprises a plurality of tensile strength elements; and
   a strain relieving member in an interior portion of the plug member to which the tensile strength elements of the camera cable are tied.

2. The underwater camera housing of claim 1, wherein the opening includes a raised plug receiving portion which extends outwardly from the housing body at an oblique angle relative to the housing body.

3. An underwater camera housing of claim 2, wherein the angle is within the range of 45°–80°.

4. An underwater camera housing of claim 3, wherein the angle is approximately 70°.

5. An underwater camera housing of claim 1, wherein the weight is pressed into the interior portion of the housing body, held in place by friction.

6. An underwater camera housing of claim 1, including a transparent member positioned at the front end of the body, forward of a lens of the camera therein, and a clamping member extending around the circumference of the body, clamping the housing body to an edge of the transparent member in a waterproof relationship.

7. An underwater camera housing of claim 6, wherein the clamping member is an elastic ring which is positioned onto the housing body and compresses the body to the transparent member, creating said watertight relationship between the housing body and the transparent member.

8. An underwater camera housing of claim 1, including a tail member which extends outwardly away from a rear end of the housing body, wherein the tail member is connected to the housing body in such a manner that it can swivel relative to the body.

9. An underwater camera housing of claim 8, wherein the tail member includes means for securing the tail to the camera cable.

10. An underwater camera housing of claim 9, wherein the securing means includes a groove in a peripheral edge of the tail member, the groove being configured so as to provide a gripping capability for the camera cable, to permit the tail to be positioned at a selected angle relative to the housing body, thereby controlling the angle between a longitudinal axis of the camera and the cable.

11. An underwater camera housing, comprising:
   a housing body, which includes a hollow interior portion for positioning of a camera therein, the housing body including a portion at a front end thereof for receiving a transparent member in a watertight relationship;
   a weight positioned in the interior portion of the housing body, sufficient to overcome the buoyancy of water, so the housing body will readily sink in water;
   a transparent member positioned at a front end portion of the housing body for being forward of a lens of the camera therein;

a clamping member extending around the circumference of the housing body, clamping the housing body to an edge of the transparent member in a waterproof relationship, the clamping member being an elastic ring which is positioned onto the housing body and which compresses the housing body to the transparent member; and an opening in the housing body communicating with the interior portion thereof for receiving therethrough a camera cable extending in a waterproof relationship to the camera.

12. The underwater camera housing as recited in claim 11, further comprising a plug member insertable into the housing body opening for receiving therethrough the camera cable that extends into the housing body, the plug member including an elastic potting material therein, wherein the camera cable extends through the plug member in a waterproof relationship thereto.

13. The underwater camera housing of claim 11, wherein tie camera cable comprises a plurality of tensile strength elements; and further comprising a strain relieving member in the interior portion of the plug member, to which the tensile strength elements of the camera cable are tied.

14. The underwater camera housing of claim 11 wherein the opening includes a raised plug receiving portion which extends outwardly from the housing body at an oblique angle relative to the housing body.

15. The underwater camera housing of claim 11, further comprising a tail member which extends outwardly away from a rear end of the housing body.

16. The underwater camera housing of claim 15, wherein the tail member attaches with a bolt and a nut, whereby the tail section can swivel to a selected position relative to the housing body.

17. The underwater camera housing as recited in claim 15, wherein the tail member includes means for securing the tail to the camera cable.

18. The underwater camera housing as recited in claim 17, wherein the securing means comprises a groove in a peripheral edge of the tail member, the groove being configured so as to provide a gripping capability for the camera cable, to permit the tail to be positioned at a selected angle relative to the housing body, thereby controlling the angle between the housing body and the cable.

19. An underwater camera housing, comprising:

a housing body, which includes a hollow interior portion for positioning of a camera therein, the housing body including a portion at a front end thereof for receiving a transparent member in a watertight relationship;

a weight positioned in the interior portion of the housing body, sufficient to overcome the buoyancy of water, so the housing body will readily sink in water;

an opening in the housing communicating with the interior portion thereof; and a plug member insertable into the housing body opening in a waterproof relationship and through which the camera cable extends into the housing body, the camera cable comprising a plurality of tensile strength elements, for attachment to the camera therein; and a strain relieving member in the interior portion of the plug member to which the tensile strength elements of the camera cable are tied.

20. The underwater camera housing as recited in claim 19, further comprising a clamping member extending around the circumference of the body, clamping the housing body to an edge of the transparent member in a waterproof relationship.

21. The underwater camera housing as recited in claim 20, wherein the clamping member is an elastic ring.

22. The underwater camera housing of claim 19, wherein the opening includes a raised plug receiving portion which extends outwardly from the housing body at an oblique angle relative to the housing body.

23. The underwater camera housing of claim 19, wherein the weight is pressfit into the interior portion of the housing body.

24. The underwater camera housing of claim 19, further comprising a tail member which extends outwardly away from a rear end of the housing body.

25. The underwater camera housing of claim 24, wherein the tail member attaches with a bolt and a nut, whereby the tail section can swivel to a selected position relative to the housing body.

26. The underwater camera housing as recited in claim 24, wherein the tail member includes means for securing the tail to the camera cable.

27. The underwater camera housing as recited in claim 26, wherein the securing means comprises a groove in a peripheral edge of the tail member, the groove being configured so as to provide a gripping capability for the camera cable, to permit the tail to be positioned at a selected angle relative to the housing body, thereby controlling the angle between the housing body and the cable.

28. An underwater camera housing, comprising:

a housing body, which includes a hollow interior portion for positioning of a camera therein, the housing body including a portion at a front end thereof for receiving a transparent member in a watertight relationship;

a weight positioned in the interior portion of the housing body, sufficient to overcome the buoyancy of water, so the housing body will readily sink in water;

an opening in the housing communicating with the interior portion thereof; and a plug member insertable into the housing body opening in a waterproof relationship and through which the camera cable extends into the housing body, for attachment to the camera therein; and a tail member extending outwardly away from a rear end of the housing body with a bolt and a nut, whereby the tail section can swivel to a selected position relative to the housing body.

29. The underwater camera housing as recited in claim 28, wherein the tail member includes means for securing the tail to the camera cable.

30. The underwater camera housing as recited in claimed 29, wherein the means for securing comprises a groove in a peripheral edge of the tail member, the groove being configured so as to provide a gripping capability for the camera cable, to permit the tail to be positioned at a selected angle relative to the housing body, thereby controlling the angle between the housing body and the cable.

31. The underwater camera housing as recited in claim 28, further comprising a clamping member extending around the circumference of the body, clamping the housing body to an edge of the transparent member in a waterproof relationship.

32. The underwater camera housing as recited in claim 28, wherein the clamping member is an elastic ring.

33. The underwater camera housing as recited in claim 28, wherein the the plug member includes an elastic potting material therein, wherein the camera cable extends through the plug member in a waterproof relationship thereto.

34. The underwater camera housing of claim 28, wherein the opening includes a raised plug receiving portion which extends outwardly from the housing body at an oblique angle relative to the housing body.

35. The underwater camera housing of claim 28, wherein the camera cable comprises a plurality of tensile strength elements; and further comprising a strain relieving member in the interior portion of the plug member, to which the tensile strength elements of the camera cable are tied.

* * * * *

UNITED STATES PATENT AND TRADEMARK OFFICE
CERTIFICATE OF CORRECTION

PATENT NO.   : 6,064,824
DATED        : May 16, 2000
INVENTOR(S)  : Phillip A. Rink Page 1 of 1

It is certified that error appears in the above-identified patent and that said Letters Patent is hereby corrected as shown below:

Claim 1, Column 4,
Line 15, change "able" to --cable--.

Claims 3-10, Column 4,
Lines 24, 26, 28, 31, 37, 42, 47, and 50, change "An" to --The--.

Claims 13, Column 5,
Line 19, change "tie" to --the--.

Claim 32, Column 6,
Line 60, change "28" to --31--.

Signed and Sealed this

Nineteenth Day of June, 2001

*Attest:*

*Attesting Officer*

NICHOLAS P. GODICI
*Acting Director of the United States Patent and Trademark Office*